United States Patent
Baldwin et al.

(10) Patent No.: US 7,926,080 B2
(45) Date of Patent: Apr. 12, 2011

(54) TRICK MODE SUPPORT FOR VOD WITH LONG INTRA-FRAME INTERVALS

(75) Inventors: James Armand Baldwin, Redwood City, CA (US); Peter T. Barrett, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1746 days.

(21) Appl. No.: 10/289,894

(22) Filed: Nov. 7, 2002

(65) Prior Publication Data

US 2004/0093618 A1 May 13, 2004

(51) Int. Cl.
*H04N 7/173* (2006.01)
*H04N 5/917* (2006.01)
*H04N 5/783* (2006.01)
*H04N 7/12* (2006.01)

(52) U.S. Cl. ............ 725/101; 725/90; 725/88; 725/102; 386/329; 386/346; 386/348; 386/350; 375/240.13

(58) Field of Classification Search .................. 725/88, 725/90, 101, 102; 386/329, 346, 348, 350; 375/240.13
See application file for complete search history.

(56) References Cited

U.S. PATENT DOCUMENTS

| | | | | |
|---|---|---|---|---|
| 5,377,051 A * | 12/1994 | Lane et al. | ...... | 386/81 |
| 5,594,491 A * | 1/1997 | Hodge et al. | ...... | 725/103 |
| 5,724,646 A * | 3/1998 | Ganek et al. | ...... | 725/89 |
| 5,864,682 A | 1/1999 | Porter et al. | | |
| 5,917,482 A | 6/1999 | Putnam | | |
| 5,933,567 A * | 8/1999 | Lane et al. | ...... | 386/68 |
| 6,005,599 A | 12/1999 | Asai et al. | | |
| 6,014,706 A | 1/2000 | Cannon et al. | | |
| 6,064,794 A * | 5/2000 | McLaren et al. | ...... | 386/68 |
| 6,065,050 A * | 5/2000 | DeMoney | ...... | 709/219 |
| 6,317,459 B1 | 11/2001 | Wang | | |
| 6,701,528 B1 * | 3/2004 | Arsenault et al. | ...... | 725/89 |
| 7,023,924 B1 * | 4/2006 | Keller et al. | ...... | 375/240.26 |
| 7,054,911 B1 | 5/2006 | Lango et al. | | |
| 7,295,608 B2 | 11/2007 | Reynolds et al. | | |
| 2002/0087994 A1* | 7/2002 | Gomez | ...... | 725/87 |
| 2002/0184637 A1* | 12/2002 | Perlman | ...... | 725/87 |
| 2003/0149975 A1* | 8/2003 | Eldering et al. | ...... | 725/34 |
| 2004/0045030 A1 | 3/2004 | Reynolds et al. | | |
| 2006/0171658 A1 | 8/2006 | Jochemsen et al. | | |
| 2007/0044010 A1 | 2/2007 | Sull et al. | | |

* cited by examiner

*Primary Examiner* — Hoang-Vu A Nguyen-Ba
(74) *Attorney, Agent, or Firm* — Lee & Hayes, PLLC (57) ABSTRACT

A video-on-demand system encodes multiple video streams from media content, such that the video streams have staggered intra-frame intervals. When a client device requests a video stream, the video-on-demand system selects one of the multiple video streams based on the position of the intra-frames, and transmits the selected video stream to the client device.

28 Claims, 5 Drawing Sheets

TRICK MODE SUPPORT FOR VOD WITH LONG INTRA-FRAME INTERVALS

TECHNICAL FIELD

This invention relates to media entertainment systems and, in particular, to systems and methods that are directed to supporting trick modes in conjunction with video-on-demand.

BACKGROUND

Many media entertainment systems allow users to access video-on-demand (VOD), such as pay-per-view movies. With higher compression rates, the ability to widely deploy VOD is improved, and the cost of such deployment is decreased. Digital video is encoded as a series of frames within a video stream. A frame may be either an intra-unit (or intra-frame) or a non-intra-unit (or non-intra-frame). An intra-frame is a frame that can be decoded and displayed without reference to any other frames. A non-intra-frame is a frame that contains only a portion of the data necessary to decode and display an entire image. An MPEG I-frame is an example of an intra-frame, while MPEG B-frames and P-frames are examples of non-intra-frames. When a client device (e.g., a set-top box) tunes to a particular video stream, a complete picture is not available until the set-top box receives and processes an intra-frame. In video streams encoded for traditional broadcast, an intra-frame is inserted every 0.5 seconds (or other very short interval) so that when a set-top box tunes to a channel on which the stream is being broadcast, the picture can be acquired quickly. Higher video compression, resulting in video streams with a much lower overall bitrate can be achieved by inserting fewer intra-frames at larger intervals, such as every 30 seconds.

When a viewer tunes to a channel over which digital video is being broadcast (e.g., by changing television channels), the viewer may experience a delay between the time at which the channel is selected and the time at which the broadcast video is displayed. The length of the delay is based on two factors; first, the interval between intra-frames in the broadcast digital video stream; and second, a current video stream location at the time the channel is tuned. For example, if a viewer changes channels such that when the new channel is tuned, the first frame received is an intra-frame, then there will be no delay in the display of the broadcast digital video. On the other hand, if the viewer changes channels such that when the new channel is tuned, the first frame received is not an intra-frame, then there will be a delay in the display until the next intra-frame is received. As a result, short intra-frame intervals are desired in broadcast digital video to minimize potential viewing delays.

Alternatively, when a viewer requests on-demand media content, the server can begin transmission of the requested media content with an intra-frame, thus avoiding any delay between tuning and display. As a result, long intra-frame intervals in on-demand media streams are tolerable because the distance between intra-frames in on-demand media streams is irrelevant with respect to channel acquisition delays.

A problem with longer intra-frame intervals in the delivery of on-demand video becomes evident, however, when one considers supporting control functions along with the video-on-demand. Control functions are those functions typically available in a video cassette recorder (VCR), such as fast forward, rewind, pause, etc. The channels over which video-on-demand is delivered are not capable of sending data faster when a user selects an accelerated speed, such as fast forward or rewind. To support such control functions, VOD systems implement "trick modes" of operation. A VOD server typically stores multiple video streams associated with a particular media content (e.g., a movie). One stream stores the media content running at normal speed, while other streams store the media content running at one or more other forward and/or reverse rates. In use, when a user selects an on-demand video, a VOD server begins transmitting a normal speed video stream. If a user selects a fast forward command, the VOD server begins transmitting a fast forward video stream, beginning the transmission at a location in the fast forward stream that corresponds to the current location of the normal speed stream. When the user subsequently selects a play command, the VOD server switches back to transmitting the normal speed video stream, beginning the transmission at a location in the normal speed video stream that corresponds to the current location of the fast forward stream that is being transmitted.

While long intra-frame intervals do not result in a viewing delay when on-demand media content is requested, long intra-frame intervals do adversely affect the resolution of trick mode navigation. For example, if the intra-frame intervals in a normal speed and a fast-forward speed video stream are one minute, then when a viewer wishes to fast forward, because of the interval between intra-frames, the viewer may only fast-forward to points in the stream at one minute intervals. For this reason, video streams that have longer intra-frame intervals, which provide higher video compression, and thus lower overall bitrate, do not lend themselves to systems that support control functions in conjunction with video-on-demand.

SUMMARY

Methods and systems for supporting trick modes in conjunction with video-on-demand that is encoded with long intra-frame intervals are described. Multiple video streams are encoded with staggered intra-frame intervals, such that a composite intra-frame interval taken over the multiple streams is significantly shorter than an intra-frame interval associated with one of the video streams. When a VOD server receives a request for a video stream associated with a trick mode, the server selects the video stream with the nearest future intra-frame.

BRIEF DESCRIPTION OF THE DRAWINGS

The same numbers are used throughout the drawings to reference like features and components.

DETAILED DESCRIPTION

The following discussion is directed to a television-based entertainment system that supports control functions in conjunction with video-on-demand encoded with a long intra-frame interval. Multiple video streams are encoded with staggered intra-frame intervals such that the multiple streams, when examined as a whole have a shorter intra-frame interval.

Exemplary Environment

Figure 1:
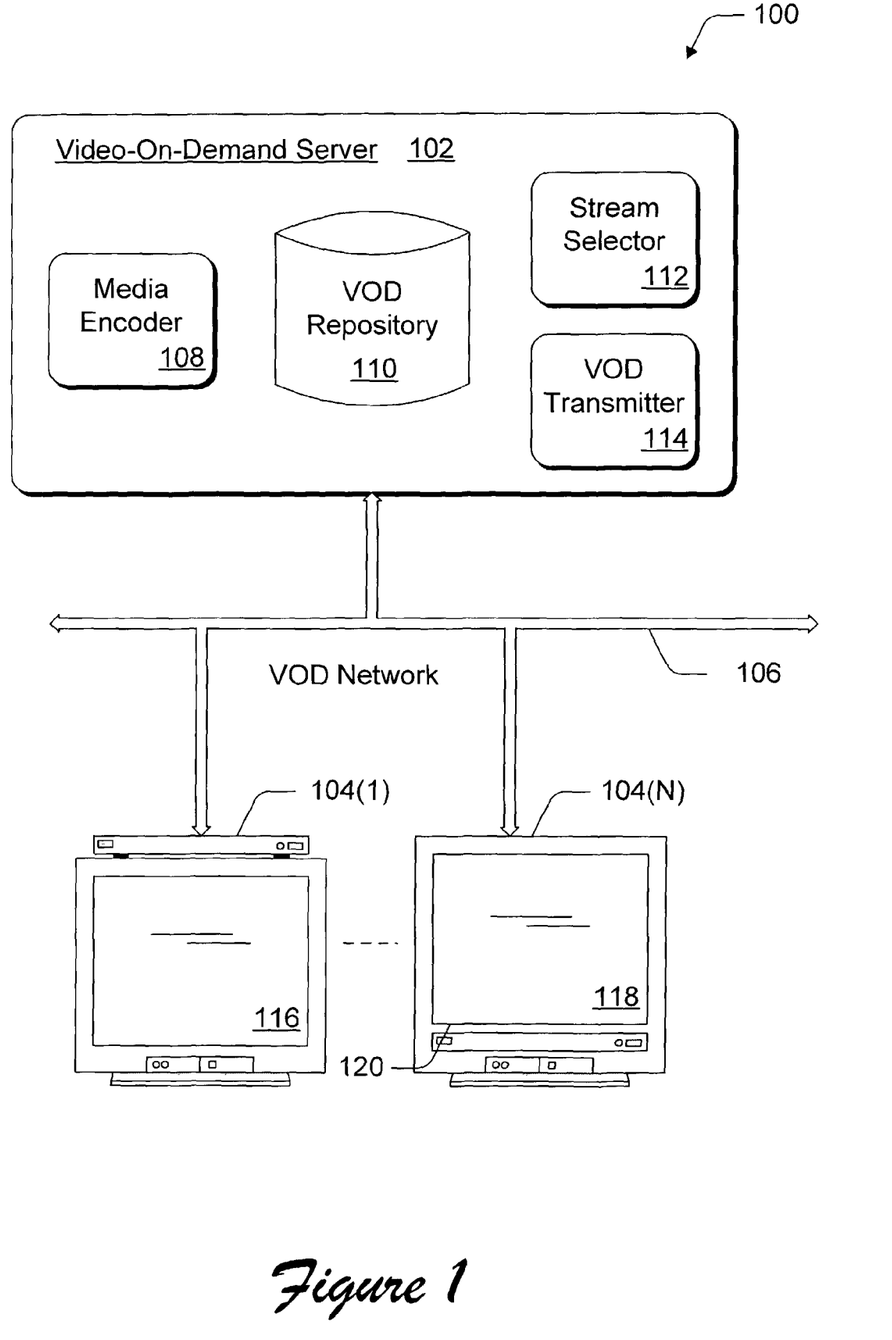
FIG. 1 illustrates an exemplary environment in which long intra-frame interval video-on-demand trick modes may be implemented.

FIG. 1 illustrates an exemplary environment 100 in which support for trick modes in conjunction with video-on-demand encoded with long intra-frame intervals may by implemented. The environment 100 includes one or more video-on-demand (VOD) servers 102 to serve VOD content to one or more client devices 104 via a VOD network 106.

VOD server 102 includes a media encoder 108, a VOD repository 110, a stream selector 112, and a VOD transmitter 114. Media encoder 108 encodes media content into multiple video streams that can support various trick modes such as fast forward and rewind. Furthermore, for each supported trick mode, media encoder 108 encodes multiple video streams with staggered intra-frame intervals. Media encoder may receive the media content to be encoded from a media content repository (not shown) or from an external media content provider (not shown). VOD repository 110 stores the encoded video streams, which may include video streams encoded at normal speed, one or more other forward speeds, and one or more reverse speeds. Stream selector 112 controls selection of appropriate video streams based on client requests. If a user selects a "play" control function, then the stream selector selects one stream from a set of normal rate, forward playing video streams. If a user selects a "fast forward" control function then the stream selector selects one stream from a set of fast forward video streams. VOD transmitter 114 controls the distribution of video streams from VOD server 102, across VOD network 106, to the one or more client devices 104. In alternate implementations, media encoder 108, VOD repository 110, stream selector 112, and/or VOD transmitter 114 may be implemented as one or more distinct components, locally as part of the VOD server 102, or remotely as part of another distinct system.

VOD network 106 can include any type of network that can support a two-way private connection between VOD server 102 and a client device 104. Additionally, VOD network 106 can be any type of network, using any type of network topology and any network communication protocol, and can be represented or otherwise implemented as a combination of two or more networks including, for example, microwave, satellite, and/or data networks, such as the Internet. Furthermore, VOD network 106 may also include wired or wireless media using any broadcast format or broadcast protocol.

Client devices 104 can be implemented in a number of ways. For example, client device 104(1) is coupled to receive content (e.g., audio data and video data) from VOD network 106 and provide the received content to associated television 116. Television 116 presents or otherwise renders the content received by the client device, as well as a graphical user interface. A particular client device 104 can be coupled to any number of televisions 116 and/or similar devices that can be implemented to display or otherwise render content. Similarly, any number of client devices 104 can be coupled to a television 116.

Client device 104(N) is an example of a combination television 118 and integrated set-top box 120. In this example, the various components and functionality of the set-top box are incorporated into the television, rather than using two separate devices. The set-top box incorporated into the television may receive content via VOD network 106. In alternate implementations, client devices 104 may receive content via the Internet or any other broadcast medium.

Figure 2:
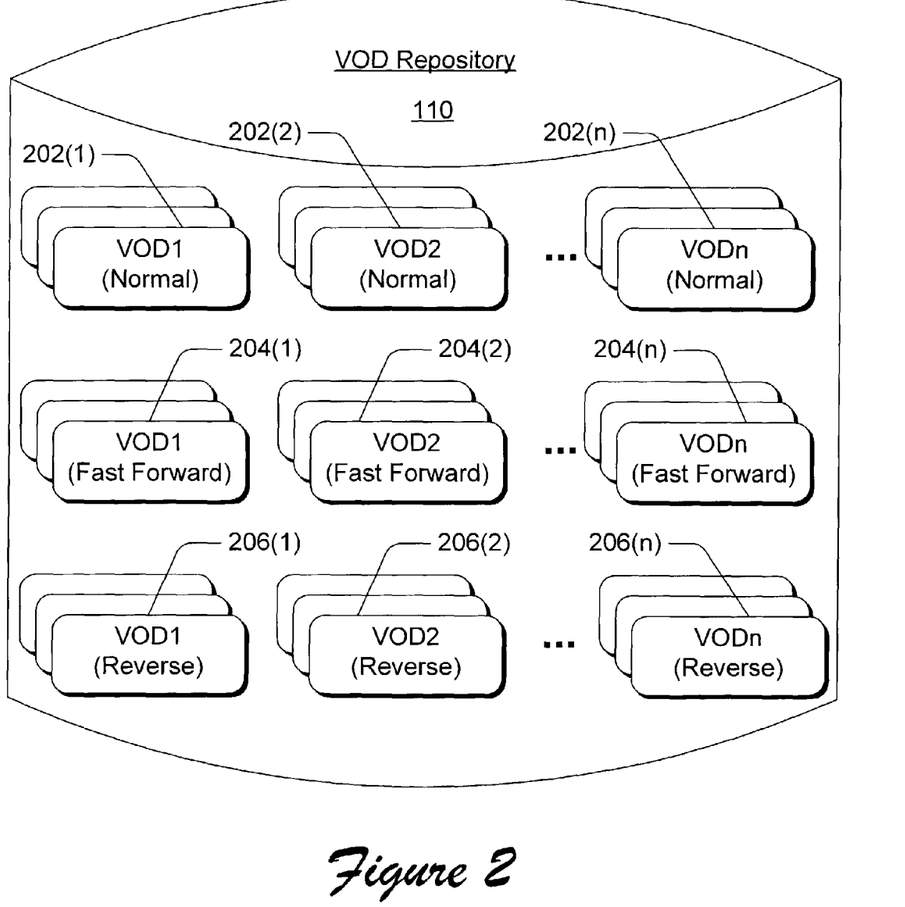
FIG. 2 illustrates an exemplary VOD repository for storing multiple video streams with staggered intra-frame intervals.

FIG. 2 illustrates an exemplary VOD repository that stores on-demand media content in the form of multiple encoded video streams with staggered intra-frame intervals. Video stream sets 202(1)-202(n) represent groups of video streams that, when played, display media content forward and at normal speed. Video stream sets 204(1)-204(n) represent groups of video streams that, when played, display the same media content that is encoded in video stream sets 202(1)-202(n), respectively, forward but at a higher speed (e.g., similar to a display generated by pressing the fast forward button on a VCR while viewing a movie). Video stream sets 206(2)-206(n) represent groups of video streams that, when played, display the same media content that is encoded in video stream sets 202(1)-202(n) and 204(1)-204(n), respectively, in reverse and at a higher speed than normal viewing (e.g., similar to a display generated by pressing the rewind button on a VCR while viewing a movie). Video stream sets 202(1), 204(1), and 206(1) are encoded representations of a first media content. Similarly, video stream sets 202(2), 204(2), and 206(2) are encoded representations of a second media content; and video stream sets 202(n), 204(n), and 206(n) are encoded representations of an $n^{th}$ media content. Normal, fast forward, and reverse are types of video streams illustrated in FIG. 2, but it is recognized that other types of video streams may also be stored in the VOD repository, including, but not limited to, slow motion forward, slow motion reverse, high speed reverse, and high speed forward.

Each of the video stream sets 202(1)-206(n) include multiple video streams with staggered intra-frame intervals. The staggered arrangement will be described in more detail with respect to FIG. 3.

VOD Trick Mode Implementation with Staggered Intra-Frames

Figure 3:
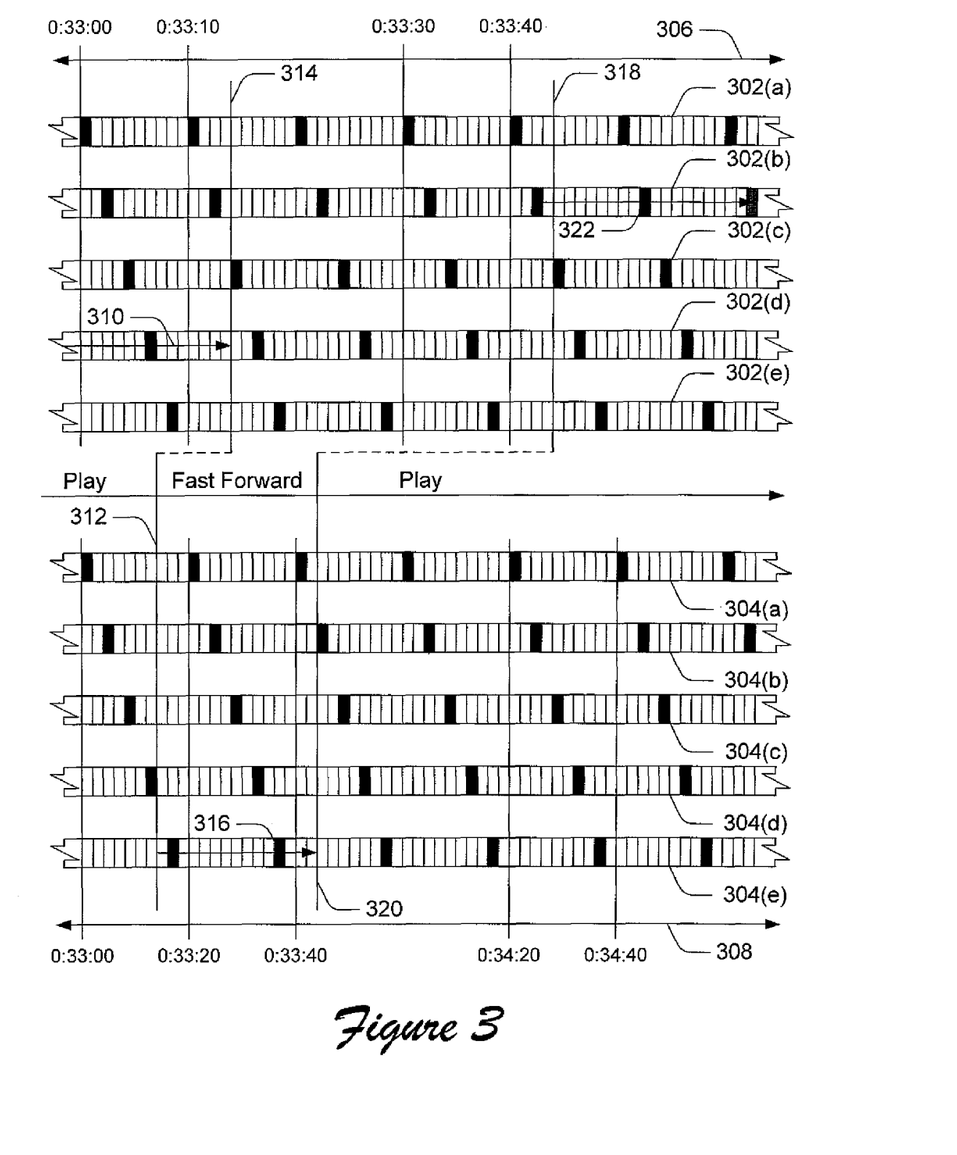
FIG. 3 illustrates an exemplary VOD trick mode implementation that utilizes multiple sets of video streams with staggered intra-frame intervals.

FIG. 3 illustrates an exemplary trick mode implementation with multiple video streams encoded with staggered intra-frame intervals. Video streams 302(a)-302(e) illustrate five forward playing, normal speed video streams of a particular media content, such as a movie. Video streams 304(a)-304(e) represent five forward playing video streams that display the same media content at twice the normal rate. FIG. 3 illustrates video streams having one frame per second. This is for illustrative purposes only, and does not reflect the actual case in which encoded video streams typically have several frames per second. Additionally, although not shown in FIG. 3, additional video streams may be encoded that display the same media content at various speeds in reverse. Timeline 306 represents elapsed movie time associated with video streams 302(a)-302(e). Timeline 308 represents elapsed movie time associated with video streams 304(a)-304(e).

Each shaded area in each of the video streams represents an encoded intra-frame. Video stream 302(a) represents media content encoded with an intra-frame interval of 10 seconds. As shown, intra-frames are encoded in video stream 302(a) at positions 0:33:00, 0:33:10, 0:33:20, 0:33:30, and so on. Video stream 302(b) represents the same media content also encoded with an intra-frame interval of 10 seconds. However, the positions of the encoded intra-frames in video stream 302(b) are staggered in relation to the positions of the encoded intra-frames in video stream 302(a). Intra-frames are encoded in video stream 302(b) at positions 0:33:02, 0:33:12, 0:33:22, 0:33:32, and so on. Similarly, video streams 302(c)-302(e) are also encoded with intra-frame intervals of 10 seconds that are staggered by two seconds in relation to the previous stream. As a result, video streams 302(a)-302(e) are a set of video streams with staggered intra-frame intervals, and when taken as a whole, has an intra-frame interval of 10 seconds.

Similarly, video streams 304(*a*)-304(*e*) have staggered intra-frame intervals with each video stream having an intra-frame interval of 10 seconds, but the set of video streams taken as a whole has an intra-frame interval of two seconds.

When a viewer requests (through a client device) the movie represented by video stream sets 302 and 304, a VOD server begins transmitting a normal rate video stream (one of video stream set 302). The particular video stream selected from the set of normal rate video streams is arbitrary, and any method may be used to select the video stream that is initially served to the requesting client device. Arrow 310 in FIG. 3 indicates that video stream 302(*d*) is the normal rate video stream initially served to the requesting client device.

At 33 minutes and 14 seconds into the movie, the VOD server receives a fast forward request from the client device. At this time, the current location of video stream 302(*d*) is indicated by reference 314. In response to the fast forward request, the VOD server examines fast forward video streams 304(*a*)-304(*e*) at a start position 312 that corresponds to the current position 314 of the currently playing video stream 302(*d*). The server selects the fast forward stream that has an intra-frame after and nearest to the start position 312. Video stream 304(*e*) satisfies this requirement. As indicated by arrow 316, the server begins transmitting fast forward video stream 304(*e*).

After 15 seconds of fast forwarding (30 seconds of elapsed movie time), the VOD server receives a request to return to transmitting the media content at normal speed. At this time, the current location of video stream 304(*e*) is indicated by reference 320. In response to the request, the VOD server examines normal rate video streams 302(*a*)-302(*e*) at a start position 318 that corresponds to the current position 320 of the currently playing video stream 304(*e*). The server selects the normal rate video stream that has an intra-frame before and nearest to the start position 318. Video stream 302(*c*) satisfies this requirement. As indicated by arrow 322, the server begins transmitting normal rate video stream 302(*c*) at the last intra frame that occurs before start position 318.

To provide optimal viewing continuity, transmission begins at the first intra-frame after the identified start position when switching from a reverse playing video stream to a forward playing video stream; and transmission begins at the first intra-frame before the identified start position when switching from a fast-forward video stream to a normal speed forward playing video stream.

Methods for Encoding Video Content

Staggered intra-frame video encoding may be described in the general context of computer-executable instructions, such as application modules, being executed by a computer. Generally, application modules include routines, programs, objects, components, data structures, etc. that perform particular tasks or implement particular abstract data types. Staggered intra-frame video encoding may also be implemented in distributed computing environments where tasks are performed by remote processing devices that are linked through a communications network. In a distributed computing environment, application modules may be located in both local and remote computer storage media including memory storage devices.

Figure 4:
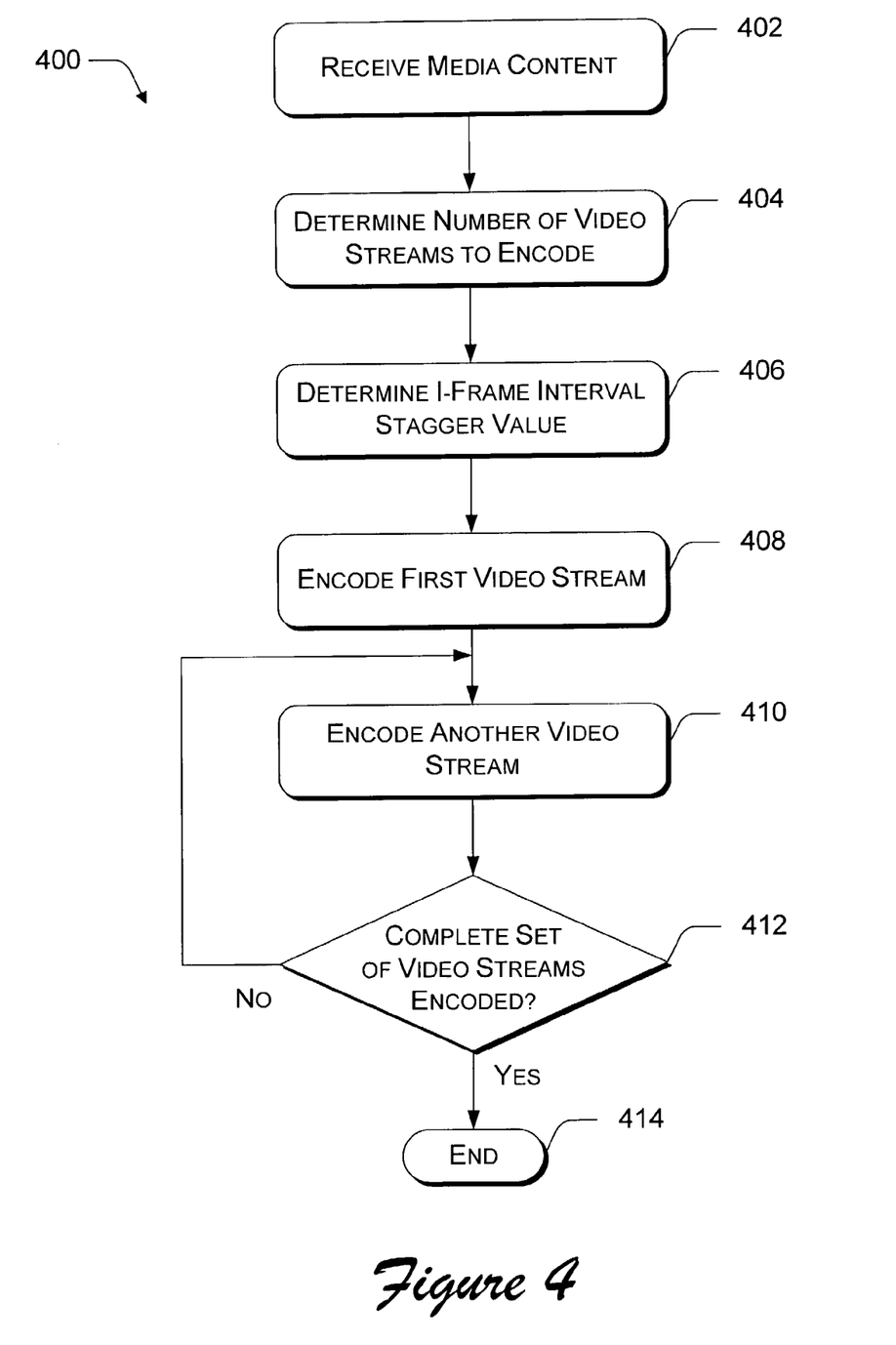
FIG. 4 illustrates a method for encoding multiple video streams with staggered intra-frame intervals.

FIG. 4 illustrates a method 400 for encoding video streams with staggered intra-frame intervals. The order in which the method is described is not intended to be construed as a limitation. Furthermore, the method can be implemented in any suitable hardware, software, firmware, or combination thereof, and is described with reference to components shown in FIG. 1.

At block 402, a media encoder 108 receives media content to be encoded. The media content may be stored or may be received as a live stream, which may be encoded into the desired format on the fly.

At block 404, the media encoder determines a number of streams to encode to result in multiple streams with staggered intra-frame intervals. In one implementation, the media encoder is configured to encode a fixed number of streams. In an alternate implementation, the media encoder determines a number of streams to encode based on a configured, preferred overall intra-frame interval. In another implementation, the media encoder determines a number of streams to encode based on a configured amount of memory available for storing the encoded streams associated with a particular media content. In yet another implementation, popularity of a particular media content may be a factor in determining the number of streams to encode. For example, a popular, recently released movie may be encoded into more streams (resulting in a smaller overall intra-frame interval and thus greater trick mode performance) than an obscure movie that was released several years ago and is not requested frequently by viewers.

At block 406, the media encoder 108 determines the amount by which to stagger the intra-frame intervals across the streams to be encoded. This determination is based on the number of streams to be encoded and the intra-frame interval with which each stream will be encoded. For example, if the media encoder encodes video streams to have an intra-frame interval of 30 seconds, then to determine the stagger amount, the media encoder divides the standard intra-frame interval (30 seconds in this case) by the number of streams to be encoded. For example, if the media encoder will encode six video streams with 30-second intra-frame intervals, then the stagger amount is 5 seconds (30 seconds/6 streams).

At block 408, the media encoder 108 encodes the first video stream into a set of staggered intra-frame video streams. In an exemplary implementation, the first frame of the stream is an intra-frame, and subsequent intra-frames are inserted according to the established intra-frame interval, such as at every 30 seconds of the stream.

At block 410, the media encoder 108 encodes another video stream in the set with the intra-frames staggered based on the position of the intra-frames in the previously encoded stream. In an exemplary implementation, the media encoder associates an index number with each encoded stream, beginning with index number 0 assigned to the first encoded stream. The first frame of the encoded stream is an intra-frame, and the second intra-frame is inserted at a position equal to the index number multiplied by the determined stagger amount. Based on the example described above in which the determined stagger amount equals five seconds, in the second encoded video stream (index=1), the second intra-frame is inserted at a position five seconds into the video stream; in the third encoded video stream (index=2), the second intra-frame is inserted at a position 10 seconds into the video stream. Third and subsequent intra-frames are inserted into each video stream according to the encoding format, such as every 30 seconds.

At block 412, the media encoder 108 determines whether the determined number of streams have been encoded. If the determined number of streams have been encoded (the "Yes" branch from block 412), then at block 414 the method ends. If the determined number of streams have not been encoded (the "No" branch from block 412), the method continues at block 410.

Methods for Supporting VOD Trick Modes

VOD trick mode support may be described in the general context of computer-executable instructions, such as application modules, being executed by a computer. Generally, application modules include routines, programs, objects, components, data structures, etc. that perform particular tasks or implement particular abstract data types.

Figure 5:
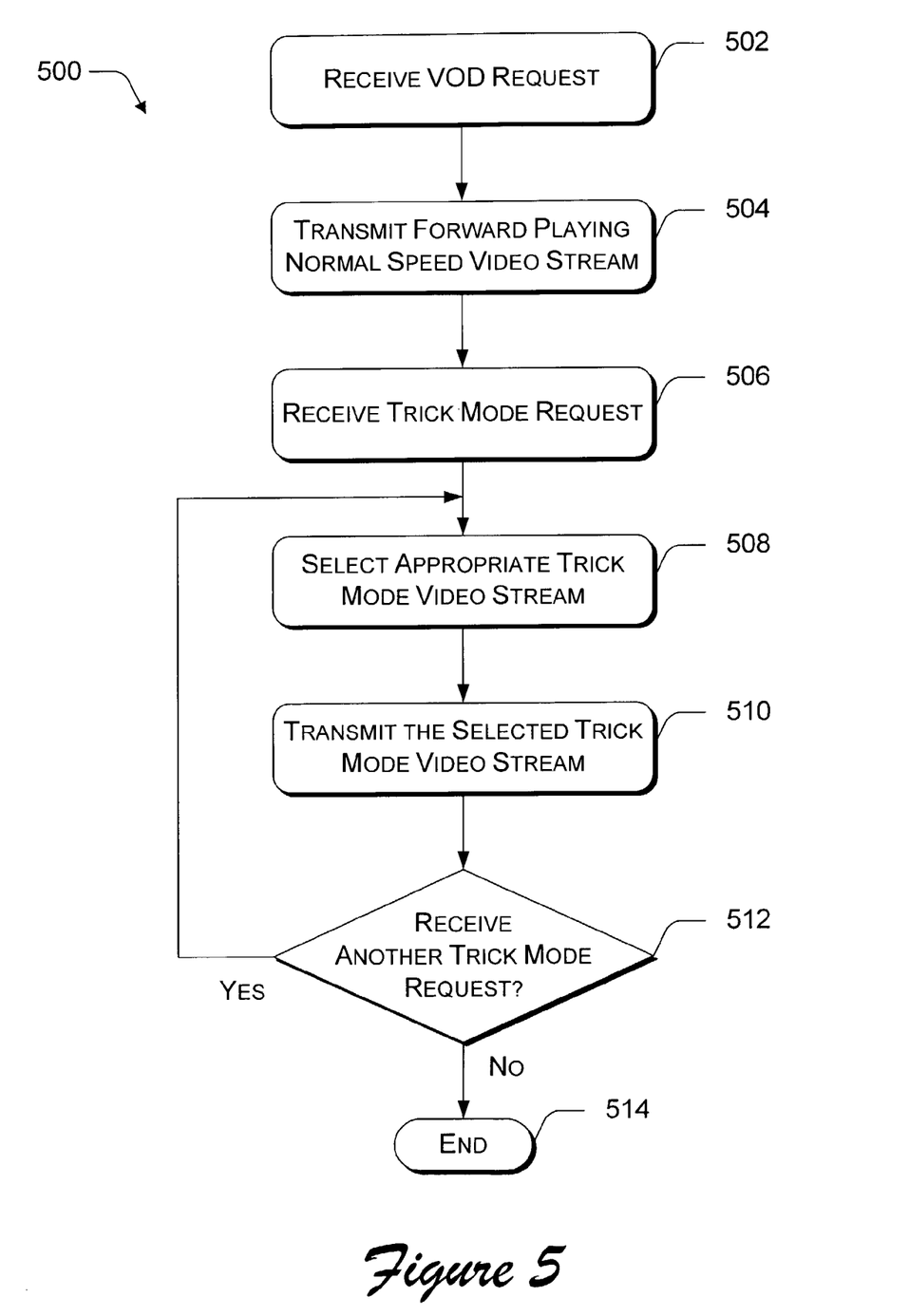
FIG. 5 illustrates a method for selecting a video stream from multiple video streams with staggered intra-frame intervals.

FIG. 5 illustrates a method 500 for supporting VOD trick modes. The order in which the method is described is not intended to be construed as a limitation. Furthermore, the method can be implemented in any suitable hardware, software, firmware, or combination thereof, and is described with reference to components shown in FIG. 1.

At block 502, a VOD server 102 receives a request from a client device to transmit a particular video-on-demand.

At block 504, a VOD transmitter 114 begins transmitting a forward playing, normal speed encoded stream of the selected video to the requesting client device.

At block 506, the VOD server 102 receives a trick mode request from the client device. The trick mode request may be, for example, a request to fast forward or rewind the video.

At block 508, a stream selector 112 selects an appropriate video stream for the VOD transmitter to begin transmitting. For example, if the client request is to fast forward the video, the stream selector selects a fast forward video stream from the multiple encoded fast forward video streams with staggered intra-frame intervals. The most appropriate stream is selected by determining the elapsed time of the video in the stream being currently transmitted, and then finding the fast forward stream that has an intra-frame after, but closest to the determined elapsed time.

At block 510, the VOD transmitter 114 begins transmitting the selected video stream to the requesting client device.

At block 512, the VOD server 102 determines whether the client device has submitted another control function request. At this point, any request for a different video stream associated with the same media content is considered a control function request. This includes a request to receive a normal speed, forward playing version of the media content (viewer selects the "play" button). If the client device has submitted another control function request (the "Yes" branch from block 512), then the method continues in block 508. If, on the other hand, the client device does not submit another control function request (the "No" branch from block 512), then at block 514 the method ends.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method for encoding video streams comprising:
receiving, at a video on-demand server, media content to be encoded;
determining, at the video on-demand server, a number of video streams to encode for each of a plurality of display speeds based on an intra-frame interval for each of the video streams, the number of video streams that is determined is greater than one;
determining, at the video on-demand server, a stagger value based on the number of video streams for each of the plurality of display speeds and the intra-frame interval; and
encoding the media content, at the video on-demand server, into each of the number of video streams for each of the plurality of display speeds, wherein a first video stream encoded for a particular display speed includes intra-frames at a particular intra-frame interval, and wherein a second video stream encoded for the particular display speed includes intra-frames at the particular intra-frame interval, the intra-frames of the second video stream being staggered by the stagger value with respect to the intra-frames of the first video stream.

2. The method as recited in claim 1 wherein the staggered intra-frame intervals are of equal length.

3. The method as recited in claim 1 wherein the encoding comprises:
assigning an index value, at the video on-demand server, to each video stream to be encoded;
encoding, at the video on-demand server, the first video stream such that a first intra-frame in the first video stream occurs at a distance equal to the intra-frame interval from a second intra-frame in the first video stream; and
encoding, at the video on-demand server, each subsequent video stream to be encoded such that in each encoded stream, a first intra-frame in the subsequent video stream occurs at a distance equal to the index value associated with the video stream multiplied by the stagger value from the first intra-frame in the first video stream and at a distance equal to the intra-frame interval from a second intra-frame in the subsequent video stream.

4. The method as recited in claim 1 wherein the intra frame interval is configurable.

5. The method as recited in claim 1 wherein the stagger value is configurable.

6. The method as recited in claim 1 wherein the number of video streams to be encoded is based on the stagger value.

7. The method as recited in claim 1 wherein the number of video streams to be encoded is configurable.

8. The method as recited in claim 1 wherein the number of video streams to be encoded is based on an amount of storage space.

9. The method as recited in claim 1 wherein the number of video streams to be encoded is based on a desired interactive response time.

10. The method as recited in claim 1 wherein the determining a stagger value comprises dividing the intra-frame interval by the number of video streams to be encoded.

11. The method as recited in claim 10 wherein the determining a stagger value further comprises rounding the result of a division calculation to the nearest integer.

12. One or more computer storage media comprising computer executable instructions that, when executed, direct a computing system to perform the method as recited in claim 3.

13. A method for encoding video streams comprising:
receiving, at the video on-demand server, media content to be encoded;
determining, at the video on-demand server, a number of video streams to encode based on an intra-frame interval for each of the video streams;
determining, at the video on-demand server, a stagger value based on the number of video streams and the intra-frame interval;

encoding the media content, at the video on-demand server, into each of a first set of multiple video streams such that each of the multiple video streams in the first set have a first display speed, wherein a first video stream of the video streams of the first set includes intra-frames at the intra-frame interval, and wherein a second video stream of the video streams of the first set includes intra-frames at the intra-frame interval, the intra-frames of the second video stream of the video streams of the first set being staggered by the stagger value with respect to the intra-frames of the first video stream of the video streams of the first set; and encoding the media content, at the video on-demand server, into each of a second set of multiple video streams such that each of the multiple video streams in the second set have a second display speed, wherein a first video stream of the video streams of the second set includes intra-frames at the intra-frame interval, and wherein a second video stream of the video streams of the second set includes intra-frames at the intra-frame interval, the intra-frames of the second video stream of the video streams of the second set being staggered by the stagger value with respect to the intra-frames of the first video stream of the video streams of the second set.

14. One or more computer storage media comprising computer executable instructions that, when executed, direct a computing system to perform the method as recited in claim 13.

15. A system comprising:
a processing device;
an interface configured to receive media content to be encoded; and
a media encoder configured to:
determine a number of video streams to encode for each of a plurality of display speeds based on an intra-frame interval for each of the video streams;
determine a stagger value based on the number of video streams for each of the plurality of display speeds and the intra-frame interval; and
encode the media content into each of the number of video streams for each of the plurality of display speeds, wherein a first video stream encoded for a particular display speed includes intra-frames at the intra-frame interval, and wherein a second video stream encoded for the particular display speed includes intra-frames at the intra-frame interval, the intra-frames of the second video stream being staggered by the stagger value with respect to the intra-frames of the first video stream.

16. The system as recited in claim 15 further comprising a repository to store the multiple video streams.

17. The system as recited in claim 15 further comprising a stream selector configured to select one of the multiple video streams for transmission to a client device.

18. The system as recited in claim 15 further comprising a VOD transmitter configured to transmit at least one of the multiple video streams to a client device.

19. A system comprising:
a processing device;
a repository configured to store:
multiple video streams of a first speed, each comprising the same media content, the multiple video streams of the first speed encoded to have staggered intra-frame intervals, relative one video stream to another, whereby each of the video streams of the first speed includes intra-frames at the same intra-frame interval; and multiple video streams of a second speed, each comprising the same media content, the multiple video streams of the second speed encoded to have staggered intra-frame intervals, relative one video stream to another, whereby each of the video streams of the second speed includes intra-frames at the same intra-frame interval; and
a stream selector configured to:
receive a request for the media content to be played at the second speed;
examine the multiple video streams of the second speed to identify a particular video stream of the second speed having an intra-frame nearest to a current position of the media content; and
select the particular video stream for transmission to a client device.

20. The system as recited in claim 19 further comprising a transmitter for transmitting the particular video stream to the client device.

21. A system comprising:
a processing device;
a media encoder configured to:
determine a number of video streams to encode for each of a plurality of display speeds based on an intra-frame interval for each of the video streams;
determine a stagger value based on the number of video streams for each of a plurality of display speeds and the intra-frame interval; and
encode particular media content into the number of video streams for each of a plurality of display speeds, each comprising the particular media content, wherein at least two video streams are encoded for a particular display speed such that the intra-frame intervals are staggered, relative one of the two video streams to the other of the two video streams;
a repository configured to store the video streams;
a stream selector configured to select one of the video streams; and
a transmitter for transmitting the one of the multiple video streams to a client device.

22. The system as recited in claim 21 wherein the number of video streams with staggered intra-frame intervals comprise:
a first video stream in which there is a standard interval between a first intra-frame and a second intra-frame; and
a second video stream in which there is the standard interval between a first intra-frame and a second intra-frame, such that between a position associated with the first intra-frame in the first video stream and a position associated with the first intra-frame in the second video stream there is a stagger interval that is not equal to the standard interval.

23. The system as recited in claim 21 wherein the stream selector is configured to select one of the number of video streams by:
determining a current position associated with a currently transmitting video stream;
identifying a start position associated with the number of video streams; and
selecting the one of the number of video streams that has an intra-frame after and close to the start position.

24. A video encoding system comprising:
a processing device;
means for receiving media content;
means for determining a number of video streams to encode based on popularity of the media content;
means for determining a stagger value based on the number of video streams and an intra-frame interval; and means for encoding the media content into each of the number of media streams, wherein a first of the video streams includes intra-frames at the intra-frame interval, and wherein a second of the video streams includes intra-frames at the intra-frame interval, the intra-frames of the second video stream being staggered by the stagger value with respect to the intra-frames of the first video stream, the first of the video streams and the second of the video streams both encoded for a particular display speed.

25. The system as recited in claim 24 further comprising:
means for selecting a media stream from the multiple media streams; and
means for transmitting the media stream.

26. One or more computer storage media comprising computer executable instructions that, when executed, direct a computing system to perform a method comprising:
receiving a particular media content;
determining a number of video streams to encode for each of a plurality of display speeds based on an intra-frame interval for each of the video streams;
determining a stagger value based on the number of video streams for each of a plurality of display speeds and the intra-frame interval; and
encoding the particular media content into each of the number of video streams for each of a plurality of display speeds, wherein a first of the video streams, encoded for a particular display speed, includes intra-frames at the intra-frame interval, and wherein a second of the video streams, also encoded for the particular display speed, includes intra-frames at the intra-frame interval, the intra-frames of the second video stream being staggered by the stagger value with respect to the intra-frames of the first video stream.

27. One or more computer storage media comprising computer executable instructions that, when executed, direct a computing system to perform a method comprising:
determining a number of video streams to encode based on popularity of particular media content;
determining a standard intra-frame interval;
determining a stagger distance; and
encoding the particular media content into each of multiple video streams, each comprising the same media content and having a common display speed, such that an intra-frame interval of each of the multiple video streams is equal to the standard intra-frame interval and a position of an intra-frame in one of the video streams differs by an integer multiple of the stagger distance from a position of an intra-frame in another one of the video streams, wherein each of the positions is measured from a beginning of the media content.

28. The one or more computer storage media as recited in claim 27, wherein determining the stagger distance comprises:
determining the stagger distance by dividing the standard intra-frame interval by the number of video streams to be encoded.

* * * * *